May 29, 1951
B. F. KIESEL
2,555,090
NUT
Filed Sept. 3, 1946
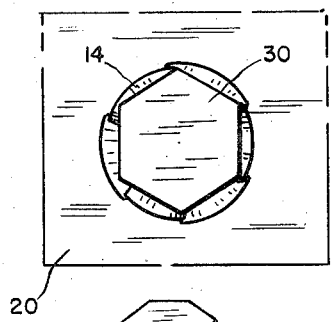
FIG.1.
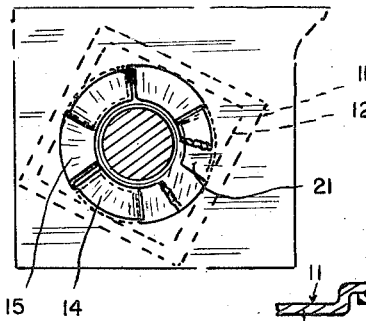
FIG.2.
FIG.6.
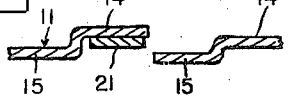
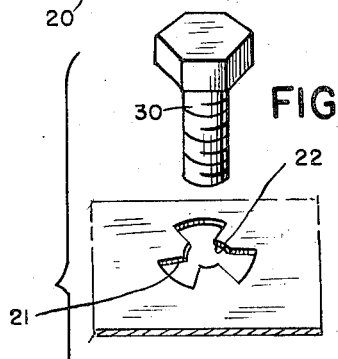
FIG.3.
FIG.4.
FIG.7.
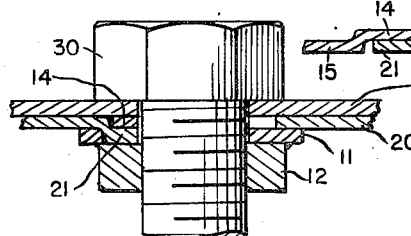
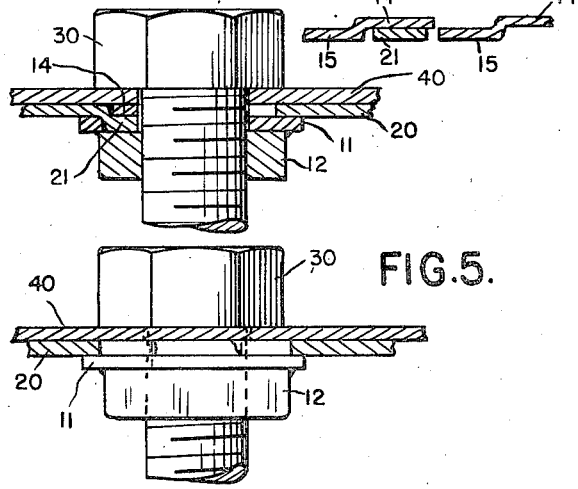
FIG.5.
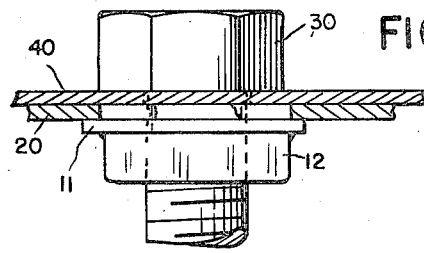
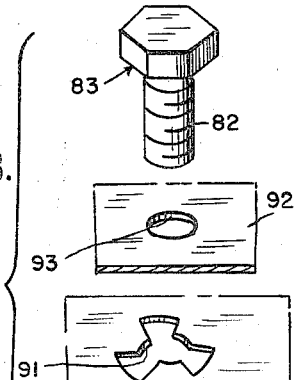
FIG.8.
FIG.9.
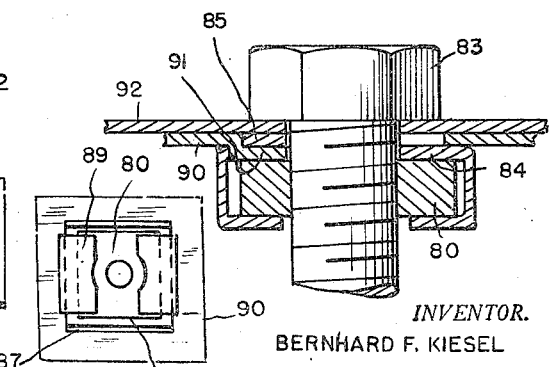
FIG.10.
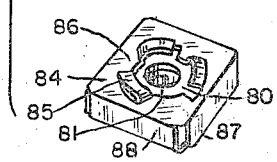
*INVENTOR.*
BERNHARD F. KIESEL
BY Whittemore, Hulbert
& Belknap ATTORNEYS Patented May 29, 1951

2,555,090

UNITED STATES PATENT OFFICE 2,555,090

NUT

Bernhard F. Kiesel, Detroit, Mich., assignor of one-half to Bertha K. Kiesel

Application September 3, 1946, Serial No. 694,463

9 Claims. (Cl. 151—33)

The present invention relates to nuts, and more particularly to a composite nut structure adapted to be preassembled with a part to be clamped.

It is an object of the present invention to provide a simple and inexpensive nut adapted for preassembly with a part, particularly a sheet metal part, so that the nut is firmly retained against displacement from the part or rotation relative thereto.

It is a further object of the present invention to provide a nut adapted for preassembly with a part which when the associated bolt is threaded thereinto and drawn up tight, cooperates with the stock of the part to form a permanent interlock therewith. It is a further object of the present invention to provide a nut designed for preassembly with apertured stock which is provided with a sealing plate effective to close and seal the aperture in the stock. A further object of the invention is to provide a nut for preassembly with apertured stock characterized by its economy of production and the ease and simplicity with which it may be assembled to the part.

Other objects and features of the invention will become apparent as the description proceeds, especially when taken in conjunction with the accompanying drawings, wherein:

Figure 1 is a plan view of a nut and bolt assembled with apertured body stock;

Figure 2 is a view similar to Figure 1 with the bolt head removed and parts broken away to expose the detailed construction;

Figure 3 is an exploded view of the parts illustrated in assembled position in Figure 1;

Figure 4 is a section through the assembly illustrating the relationship between the nut, the bolt, and two pieces of sheet stock;

Figure 5 is a sectional view similar to Figure 4 taken along a line radially displaced from the axis of the bolt;

Figure 6 is a diagrammatic view illustrating the relationship of interlocking tangs prior to tightening of the bolt;

Figure 7 is a view similar to Figure 6 illustrating the deformation of the tangs resulting from tightening of the bolt;

Figure 8 is an exploded view of parts illustrating a somewhat different modification;

Figure 9 is an axial section through an assembly of the parts illustrated in Figure 8; and Figure 10 is a bottom plan view of the assembly illustrated in Figure 9 on a reduced scale.

Referring first to the embodiment of the invention illustrated in Figures 1 through 7, there is illustrated a nut assembly 10 which comprises a plate 11 secured to one face of a conventional nut 12. The plate 11 and nut 12 may be assembled by welding, staking or the like. As best seen in Figure 3, the plate 11 has a plurality of cut-out portions 13 forming tangs 14 which project upwardly from the plane of the plate 11 and which preferably are shaped with a curved length as illustrated so as to provide frictional engagement with their associated part. Intermediate the cut-out portions which provide the tangs 14, the material of the plate projects inwardly in its own plane to provide radial shoulders 15.

Preferably the cut-out portions 13 are proportioned so that they underlie portions of the nut 12, with the result that in the completed nut assembly the plate is imperforate outwardly from the nut, for a purpose which will presently appear.

In use the nut assembly 10 is adapted to be preassembled with apertured stock 20 which may be sheet metal and which has the aperture therein shaped to provide a plurality of radially inwardly extending tangs 21 adapted to cooperate with tangs 14 of the nut assembly. Tangs 21 terminate inwardly to define a central bolt receiving opening 22. At 30 in Figure 3 is illustrated a conventional bolt which is adapted to thread into the nut 12 so as to assemble the apertured plate 20 with a second plate such as the plate 40 in Figure 4 which is provided with a round opening of sufficient size to permit passage of the threaded shank of the bolt 30.

It will be apparent that the nut assembly 10 may be assembled with the apertured plate 20 simply by introducing the bent tangs 14 through the spaces between the tangs 21 and thereafter rotating the nut assembly so as to cause the tangs 14 to overlie the tangs 21. Further rotation of the nut assembly 10 will be prevented by engagement between the fixed end of the tangs 14 with the edges of the tangs 21, and due to the frictional engagement resulting from the curved or bent conformation of the tangs 14, the nut assembly 10 is retained against accidental displacement from the apertured plate 20. In practice the assembly is completed by passing the bolt 30 through a suitably formed opening in the plate 40 and thereafter engaging the bolt 30 with the nut 12. It will be appreciated that the present invention finds its greatest field of utility in assembling parts in which the nut is located at the interior of a hollow part or in a position where ready access thereto is not to be had. Furthermore, in rapid assembly of parts the bolt 30 will be threaded home by means of a power tool, with the result that substantial pressure may be applied against the nut assembly 10 during the operation.

One of the important features of the present invention resides in the arrangement which results in establishing a permanent lock between the nut assembly 10 and the apertured plate 20 when the bolt 30 is brought into firm clamping engagement with the parts. This arrangement is best illustrated in diagrammatic Figures 6 and 7. In Figure 6 the tang 21 formed in the apertured plate 20 is illustrated as underlying a tang 14 of the plate 11 and as occupying a position above the plane of the plate 11. The relative circumferential extent of the tangs 14 and 21 is such that in assembled position the tang 21 is completely overlain by the tang 14 and does not itself overlie the portion 15 of the plate 11. Accordingly, when clamping pressure is exerted between the parts by moving the bolt 30 into the nut 12 the parts assume the position shown in Figure 7, which illustrates the tang 21 as bent downwardly into the plane of the plate 11 so as to lie between a pair of the inwardly projecting portions 15. It will be appreciated that with the parts in the relative position shown in Figure 7, it will be impossible to withdraw the nut assembly 10 from the plate 20 except by forcing the tangs 21 upward beyond the plane of the plate 11. This construction renders the nut assembly substantially permanent with the apertured stock 20. Ordinarily the parts being assembled are cold rolled stock so that when the parts have been caused to assume the relative position shown in Figure 7 a permanent deformation has been imparted thereto.

While in Figures 6 and 7 there is illustrated an arangement in which the tang 21 is completely overlain by the tang 14, it will be appreciated that a substantially equivalent result will be obtained even though the tang 21 is of a width so that in assembled position it continues to overlie a portion of the inwardly projecting part 15 of the apertured stock. In this case the entire extent of the tang 21 is not bent downwardly into the plane of the plate 11 but a portion of it underlying the tang 14 will be bent downwardly with substantially the same result.

It will be appreciated from Figure 3 that the opening in the apertured body stock 20 is substantially larger than the threaded shank of the bolt 30 in order to provide the radially inwardly extending tangs 21. It is desirable in the assembled structure to provide a seal for this opening and the plate 11 is adapted to perform this function. It is for this reason that the plate 11, outwardly from the nut 12, is imperforate and in the assembled structure this plate forms a seal which prevents leakage around the nut and bolt assembly. As best seen in Figure 3, the cut-out portions 13 and the tangs 14 are therefore proportioned to lie within the boundary of the square nut 12.

Referring now to Figures 8 to 10, a similar construction is provided. As best seen in Figure 8, the assembly comprises a square nut 80 having the usual central threaded opening 81 for receiving the threaded shank 82 of a bolt 83. The nut 80 has secured adjacent one face thereof a plate 84 which has cut-out portions providing offset tangs 85 separated by intermediate radially inwardly extending portions 86 coplanar with the plate 84. In this case the plate 84 is held assembled with the nut 80 by a plurality of flanges 87 and 88. The flanges 87, as best seen in Figure 10, extend upwardly and lie along the side of the nut 80. The flanges 88 are bent over the opposite face of the nut as indicated at 89 in Figure 10. This provides a cage which receives the nut 80 and retains it relatively loosely therein but which is nevertheless effective to prevent rotation of the nut 80 relative to its cage.

The nut assembly is designed for assembly with apertured sheet stock 90 which has a plurality of radially inwardly extending tangs 91 which are initially coplanar therewith. At 92 is illustrated a portion of a second part preferably of sheet stock having a circular opening 93 adapted to freely receive the threaded shank 82 of the bolt 83.

It will be appreciated that the nut assembly is preassembled with the body stock 90 by introducing the tangs 85 into the spaces between the tangs 91 of the body stock and thereafter a slight rotation of the nut assembly causes the tangs 85 and 91 to interlock. Preferably the relative circumferential extent of the flanges 85 and 91 is such that in the assembly the tang 91 is completely overlain by the tang 85. This permits downward displacement of the tang 91 into the plane of the plate 84 by pressure applied thereto by the tang 85, all as well illustrated in Figure 9. It will be appreciated that Figure 9, like Figure 7, is an idealized view and that in practice the tang 91 may not be deformed completely into the plane of the plate 84. It will, however, be moved downwardly so as to occupy a portion of the space intermediate the coplanar portions 86 of the plate 84 and will therefore be effective to prevent removal of the nut assembly from the apertured plate stock.

In this modification of the invention the cut-out portions which provide the tangs 85 are preferably located so that they are covered by the nut 80 and the nut assembly is therefore effective to provide a seal for the aperture formed in the body stock 90.

While there is illustrated and described in considerable detail two preferred embodiments of nuts adapted for preassembly with sheet body stock, it will be appreciated that this full disclosure has been made solely to enable those skilled in the art to practice the invention, the scope of which is indicated by the appended claims.

What I claim as my invention is:

1. For use with a flat part having an enlarged opening provided with a plurality of radially inwardly projecting tangs which are initially coplanar with said part and which terminate inwardly of said opening so as to define a bolt receiving hole therethrough: a nut adapted to be interlocked with said part, said nut provided with a sheet metal plate having a bolt receiving opening and a plurality of circumferentially extending tangs at the side of said opening bent outwardly from the plane of said plate and engageable over the inwardly projecting tangs of said part, the relative circumferential extent of said tangs being such that in assembled position the inwardly projecting tangs of said part are completely covered by the tangs of said plate.

2. For use with a flat part having an enlarged opening provided with a plurality of radially inwardly projecting tangs which are initially coplanar with said part and which terminate inwardly of said opening so as to define a bolt receiving hole therethrough: a nut adapted to be interlocked with said part, said nut provided with a sheet metal plate having a bolt receiving opening and a plurality of circumferentially extending tangs at the side of said opening bent outwardly from the plane of said plate and engageable over the inwardly projecting tangs of said part, said plate being uninterrupted outwardly of said nut so as to provide a seal for the opening formed in said part.

3. For use with a flat part having an enlarged opening provided with a plurality of radially inwardly projecting tangs which are initially coplanar with said part and which terminate inwardly of said opening so as to define a bolt receiving hole therethrough: a nut adapted to be interlocked with said part, said nut provided with a sheet metal plate having a bolt receiving opening and a plurality of circumferentially extending tangs at the side of said opening bent outwardly from the plane of said plate and engageable over the inwardly projecting tangs of said part, said plate being permanently secured to one face of said nut, extending laterally therefrom, and being imperforate outwardly therefrom to provide a seal for the opening in said part.

4. In combination, a flat part having an enlarged opening provided with a plurality of radially inwardly projecting tangs which are initially coplanar with said part and which terminate inwardly of said opening so as to define a bolt receiving hole therethrough, a nut adapted to be interlocked with said part, said nut provided with a sheet metal plate having a bolt receiving opening and a plurality of circumferentially extending tangs at the side of said opening bent outwardly from the plane of said plate and engageable over the inwardly projecting tangs of said part, the relative circumferential extent of said tangs being such that in assembled position the inwardly projecting tangs of said part are completely covered by the tangs of said plate.

5. A nut for preassembly with a part having a bolt-receiving aperture and a plurality of radially inwardly extending tangs therein comprising: a nut body having a threaded opening therethrough, an assembly plate for mounting said nut to the part with the threaded opening in said nut aligned with the bolt-receiving aperture in the part, a bolt-receiving opening in said assembly plate having a plurality of attaching tangs at the side of the opening therein shaped to interlock with the tangs on the part, the bolt-receiving opening in said plate being located entirely within the sides of said nut body, said plate being shaped to engage the surface of said part continuously around the bolt-receiving opening in the part in sealing relation thereto.

6. A nut for preassembly with a flat part having a bolt-receiving opening therein provided with a plurality of tangs extending radially inwardly from the sides of said opening comprising: a nut body, an assembly plate carried by said nut body, said plate having a bolt-receiving opening, a plurality of assembly tangs on said plate at the sides of said opening, said tangs projecting outwardly from said plate along radial lines to provide radial shoulders, and extending circumferentially of the opening from said shoulders in position to completely overlie the tangs in the flat part upon rotation of said nut after insertion of the tangs of said plate into the spaces between the tangs of said flat part.

7. In combination, a flat part having an enlarged opening provided with a plurality of radially inwardly projecting tangs which are initially coplanar with said part and which terminate inwardly of said opening so as to define a bolt receiving hole therethrough, a nut adapted to be interlocked with said part, said nut provided with a sheet metal plate having a bolt receiving opening and a plurality of circumferentially extending tangs at the side of said opening bent outwardly from the plane of said plate and engageable over the inwardly projecting tangs of said part, said plate being uninterrupted outwardly of said nut so as to provide a seal for the opening formed in said part.

8. In combination, a flat part having an enlarged opening provided with a plurality of radially inwardly projecting tangs which are initially coplanar with said part and which terminate inwardly of said opening so as to define a bolt receiving hole therethrough, a nut adapted to be interlocked with said part, said nut provided with a sheet metal plate having a bolt receiving opening and a plurality of circumferentially extending tangs at the side of said opening bent outwardly from the plane of said plate and engageable over the inwardly projecting tangs of said part, said plate being permanently secured to one face of said nut, extending laterally therefrom, and being imperforate outwardly therefrom to provide a seal for the opening in said part.

9. A connection between an apertured member and a metal panel comprising a nut having a plate secured thereto, said plate having a bolt receiving opening and a plurality of arcuate tangs cut out from the material surrounding the opening and joined at one end to said plate, said panel having an opening including a plurality of radially inwardly extending tangs, said plate being in surface-to-surface abutment with said panel, said arcuate tangs completely overlying said radial tangs at the opposite side of said panel from said plate, said apertured member having its aperture in alignment with the apertures in said nut, plate and panel and abutting said panel in surface-to-surface relation surrounding its aperture, a bolt extending through all of the apertures, and pressing the parts together, said arcuate tangs being held by pressure in the plane of said panel, said radial tangs being displaced by said pressure to occupy the plane of said plate beneath said arcuate tangs, the cutout portions of said plate lying within the periphery of said nut to form a seal therewith.

BERNHARD F. KIESEL.

REFERENCES CITED

The following references are of record in the file of this patent:

UNITED STATES PATENTS

| Number | Name | Date |
| --- | --- | --- |
| 1,062,635 | Clements | May 27, 1913 |
| 2,233,242 | Burke | Feb. 25, 1941 |
| 2,282,360 | Horrocks | May 12, 1942 |
| 2,398,374 | Hartman | Apr. 16, 1946 |
| 2,404,372 | Hallock | July 23, 1946 |